(12) United States Patent
Moro

(10) Patent No.: US 6,363,351 B1
(45) Date of Patent: *Mar. 26, 2002

(54) SUBSCRIBER REGISTRATION AND ACCESS CONTROL SYSTEM AND RELATED METHODS

(76) Inventor: Paolo Moro, 45 Maresfield Gardens, London (GB), NW3 5TE ( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/972,909

(22) Filed: Nov. 18, 1997

(51) Int. Cl.[7] .............................................. G06F 17/60
(52) U.S. Cl. .............................. 705/1; 707/10; 340/5.8; 340/5.2; 235/380; 700/237; 700/241
(58) Field of Search ...................... 705/1, 5, 13, 26–28, 705/32; 235/375, 379, 380, 381, 384; 340/5.2, 5.8; 700/213, 233, 235, 237, 241; 707/104.1, 10

(56) References Cited

U.S. PATENT DOCUMENTS

| | | |
|---|---|---|
| 3,622,995 A | 11/1971 | Dilks et al. |
| 5,066,853 A | 11/1991 | Brisson |
| 5,239,480 A | 8/1993 | Huegel |
| 5,287,269 A | 2/1994 | Dorrough et al. |
| 5,408,417 A | 4/1995 | Wilder |
| 5,502,806 A | 3/1996 | Mahoney et al. |
| 5,504,321 A | 4/1996 | Sheldon |
| 5,566,327 A | 10/1996 | Sehr |
| 5,614,703 A | 3/1997 | Martin et al. |
| 5,687,087 A | * 11/1997 | Taggart .................. 364/479.03 |
| 5,732,398 A | * 3/1998 | Tagawa .......................... 705/5 |
| 5,797,126 A | * 8/1998 | Helbling et al. ................ 705/5 |
| 5,797,127 A | * 8/1998 | Walker et al. .................. 705/5 |

FOREIGN PATENT DOCUMENTS

| | | | |
|---|---|---|---|
| BE | 1006392 A3 | 8/1994 | |
| EP | 0 210 963 A2 | 7/1986 | ............ G07B/15/00 |
| NL | 9301902 | 11/1993 | .......... G06K/19/07 |
| WO | WO 90/09002 | 8/1990 | ........... G06F/15/26 |
| WO | WO 91/04542 | 4/1991 | ........... G06F/15/21 |
| WO | WO 91/07732 | 5/1991 | ........... G07B/15/00 |
| WO | WO 94/27258 | 11/1994 | ............. G07F/7/08 |
| WO | WO 95/16245 | 6/1995 | ......... G06K/19/067 |

OTHER PUBLICATIONS

Weinberg et al. "a model based system for use in planning a performance arts series", Managment Science, vol. 24, No. 6, pp. 654–665, Feb. 1978.*

* cited by examiner

Primary Examiner—Vincent Millin
Assistant Examiner—Hani M. Kazimi
(74) Attorney, Agent, or Firm—Allen, Dyer, Doppelt, Milbrath & Gilchrist, P.A.

(57) ABSTRACT

A system grants authorized subscribers access to selected ones of entertainment events at various entertainment venues. The system preferably comprises a central processing station and plurality of access point controllers. The central processing station preferably permits registering of subscribers that can be authorized to attend selected entertainment events. The central processing station also generates and stores a record relating to authorization of a subscriber to attend a selected entertainment event. Each of the access point controllers preferably reads a subscriber identifier presented by the subscriber attending the respective entertainment event, and confirms that the subscriber attending the respective entertainment event has been authorized based upon the subscriber identifier. This system permits subscribers to prearrange for attendance at a selected event and/or venue, and does not suffer from the drawbacks of conventional paper tickets.

52 Claims, 3 Drawing Sheets

SUBSCRIBER REGISTRATION AND ACCESS CONTROL SYSTEM AND RELATED METHODS

FIELD OF THE INVENTION

This invention relates to systems for granting access to entertainment events, and more particularly, to a system and associated method for controlling sales and granting access to entertainment events at various entertainment venues.

BACKGROUND OF THE INVENTION

As the information age frees up even more consumer time, and creates a smaller world, more consumers are taking advantage of the numerous entertainment events available in society. These events and venues include, but are not limited to, theme parks, sporting events, music halls, museums, theaters, arenas, stadiums, and movie theaters. With many of these events, tickets can be reserved beforehand, and later picked up at the gate. Tickets can also be purchased beforehand, such as through a Ticket Master™ or similar ticket service. Sometimes a central ticketing service can be called before arriving at an event, the ticket ordered, and then mailed from the ticketing service to the caller. However, in such systems, the tickets can be lost in the mail or misplaced. If the prepaid tickets are lost, then one typically must obtain a refund.

Lost tickets can also be used by those that find the ticket, making it even more difficult to obtain a refund when the ticket has been used by an unauthorized person. If a replacement ticket had been issued, and an unauthorized person shows up to the event with the ticket, then conceivably two people could be requesting the same seat. Also, with this type of prepaid ticket, it is difficult to maintain data on past, present and future attendance at the various entertainment venues and events serviced by the particular ticket service center.

Some ticketing systems use a credit card reader at the point of entry. Typically, the consumer calls a service center established by an entertainment venue, and gives their credit card number over the telephone. A reservation then can be made. At the time of entry to the gate, the consumer receives their ticket for entry and the credit card is charged the value of the ticket. Typically, a credit card receipt is given at the time of entry.

In many of these systems, the type of payment and ticket delivery method is dependent upon how each entertainment venue establishes an account and allows entry to the event. It would be advantageous if greater control could be exercised over the sale of tickets and access to various entertainment venues, while also limiting the number of times that a consumer would have to provide credit card information over the telephone or use the credit card at the venue, even for different events at the same venue. It may also be advantageous if a consumer's attendance could be tracked in real time.

Some prior art systems such as a conventional ticket-based system, issue a paper ticket from an outlet, which then is exchanged for an appropriate card or other media at an entertainment venue, such as a theme park, sports venue or music hall. This two-step process is inefficient and the card typically is not used for multiple venues. It would also be advantageous if some means could be established for allowing more universal access to entertainment events, while maintaining control over access rights in a central computer system. Some prior art systems, such as used in airports and some theme parks, disclose control systems that include card readers at various access points, and a central station for issuing or programming access cards. For example, U.S. Pat. No. 5,287,269 to Dorrough, et al., discloses a card-based system for controlling access to recreational activities. It also controls access to hotel/motel rooms to provide prepaid credit units for the purchase of tickets to events and provide prepaid concessions. An access card is encoded for each customer and an access station is associated with each activity and reads an access card to signal a comptroller processor to open a customer account file. The access station sends a debt signal for the requested activity. The comptroller processor can either approve or disapprove the transaction.

In U.S. Pat. No. 5,566,327 to Sehr, a smart debit card is issued to a patron, which can be used for a plurality of categories of prepaid theme park goods and services. A computer system is connected to the various events, stores and other activities located throughout the theme park. U.S. Pat. No. 5,502,806 to Mahoney, et al., discloses a waiting line management system where an access card is issued to a patron, which enables a patron to select access times for various attractions. The patron is able to confirm the existing selections, change any previous selections, and then pay for other services without using cash. In one particular aspect of the invention, the card holders have priority in waiting lines for attractions.

Other airline reservation systems provide for prepayment of airline tickets and central control over the reservation system. For example, U.S. Pat. No. 3,622,995 to Dilks, et al., discloses a data processing system for automatic on-line checking of numbered reservations and/or the control of credit card purchases. Data is not referenced on the ticket or credit card itself. The system includes a central processor, a remotely addressable central data storage for reservation and customer account information, and remote terminal input devices, printers, and ticket and card readers. The system may also include an automatic boarding pass issuing device responsive to a central processor. In another similar type of reservation system, U.S. Pat. No. 5,504,321 to Sheldon discloses a "ticketless" airline reservation system, which includes a smart card or a card with a magnetic strip for the user.

Although these patents do establish some control over ticket purchase and customer access to various entertainment events or airlines, it would be advantageous if a system could provide purchase of rights for future access to a plurality of different venues that could be owned by different organizations and have real time customer tracking and centralized control of customer access. It would also be advantageous if such a system could maintain records of past attendance and present attendance, and use such information to aid in anticipating future (or expected) attendance at a particular venue and event.

SUMMARY OF THE INVENTION

In view of the foregoing background, it is therefore an object of the present invention to provide a system for granting access to one or more entertainment events, which controls the sales and access to entertainment events at various entertainment venues, such as at multiple locations, which may be owned by different organizations.

It is still another object of the present invention to provide a computer entertainment access control system for purchasing rights for future access to entertainment events located at a venue and later provide real time tracking of customers or subscribers who have been granted or not been granted access.

These and other objects, features, and advantages in accordance with the present invention are provided by a system for granting authorized subscribers access to selected ones of a plurality of entertainment events at a plurality of entertainment venues. The system preferably comprises a central processing station and plurality of access point controllers. The central processing station preferably comprises registration means for permitting registering of subscribers that can be authorized to attend selected entertainment events, and event authorization means for generating and storing a record relating to authorization of a subscriber to attend a selected entertainment event.

Each of the plurality of access point controllers preferably comprises subscriber identifier reading means for reading a subscriber identifier presented by the subscriber attending the respective entertainment event, and authorization confirming means communicating over the communications network for confirming that the subscriber attending the respective entertainment event has been authorized, based upon the subscriber identifier. The access point controller also preferably includes access granting means, cooperating with the authorization confirming means, for granting access at the entertainment event to the authorized subscriber. This system permits subscribers to prearrange for attendance at a selected event and/or venue, and does not suffer from the drawbacks of conventional paper tickets.

The central processing station also preferably further comprises an operator console for permitting an operator to receive a communication from a subscriber, such as to register or purchase a right to attend a future event. The registration means may comprise account means for establishing a payment account for the subscriber. Of course, the event authorization means may therefore comprise account updating means for updating an account of the subscriber.

The event authorization means may preferably comprise a database for storing records relating to authorization of subscribers to attend selected entertainment events. The event authorization means may also include booking means for coordinating availability at the selected entertainment event. In addition, the event authorization means may include time scheduling means for authorizing attendance of an authorized subscriber at the entertainment even at a predetermined time.

Another significant aspect of the present invention is that the central processing station may further comprise expected attendance analyzing means. The expected attendance analyzing means may cooperate with the venue authorization means for analyzing expected attendance at a future entertainment event. Accordingly, the organization or individuals coordinating the event may know well in advance the expected attendance. In another embodiment, the expected attendance analyzing means may be at the entertainment venue.

Yet another aspect of the invention is that the central processing station may further comprise attendance storing means, cooperating with the plurality of readers, for generating and storing a record relating to actual attendance of the subscriber at the selected entertainment venue. Accordingly, the central processing station may also include actual attendance analyzing means, cooperating with the attendance storing means, for analyzing actual attendance at a past entertainment event.

Yet another important aspect of the invention is that the central processing station may further include universal token issuing means for issuing a universal token to the subscriber to serve as the subscriber identifier for the plurality of entertainment venues. The universal token may be a card carrying a magnetic stripe or optical bar code, for example. The universal card is relatively inexpensive, but facilitates access to a large number of possible entertainment events and venues.

The central processing station may further comprise a first transceiver, such as a modem, for communicating over the communications network. Accordingly, the authorization confirming means may also include a second transceiver for communicating over the communications network and with the first transceiver in real time. The real time tracking of actual attendance provided by the present invention may be especially beneficial to organizations or others who schedule and coordinate entertainment events. This data could be sold to others or used as historical information.

A method aspect of the invention grants authorized subscribers access to selected ones of a plurality of entertainment events at a plurality of entertainment venues such as a music hall venue, sports venue, theme park venue or other entertainment venue. The method comprises the steps of first registering subscribers at a central processing station for authorizing the subscribers to attend selected entertainment events. The method further comprises generating and storing a record relating to authorization of a subscriber to attend a selected entertainment event. A plurality of access point controllers are located at respective entertainment venues. A subscriber identifier presented by a subscriber attending a respective entertainment event is then read at an access point reader located at the entertainment venue. The method further comprises the step of confirming that the subscriber attending that respective entertainment event has been authorized to attend. Access is then granted to the subscriber if the subscriber has been authorized to attend the respective entertainment event.

BRIEF DESCRIPTION OF THE DRAWINGS

Other objects, features and advantages of the present invention will become apparent from the detailed description of the invention as follows, when considered in light of the accompanying drawings in which.

DETAILED DESCRIPTION OF THE PREFERRED EMBODIMENTS

Figure 1:
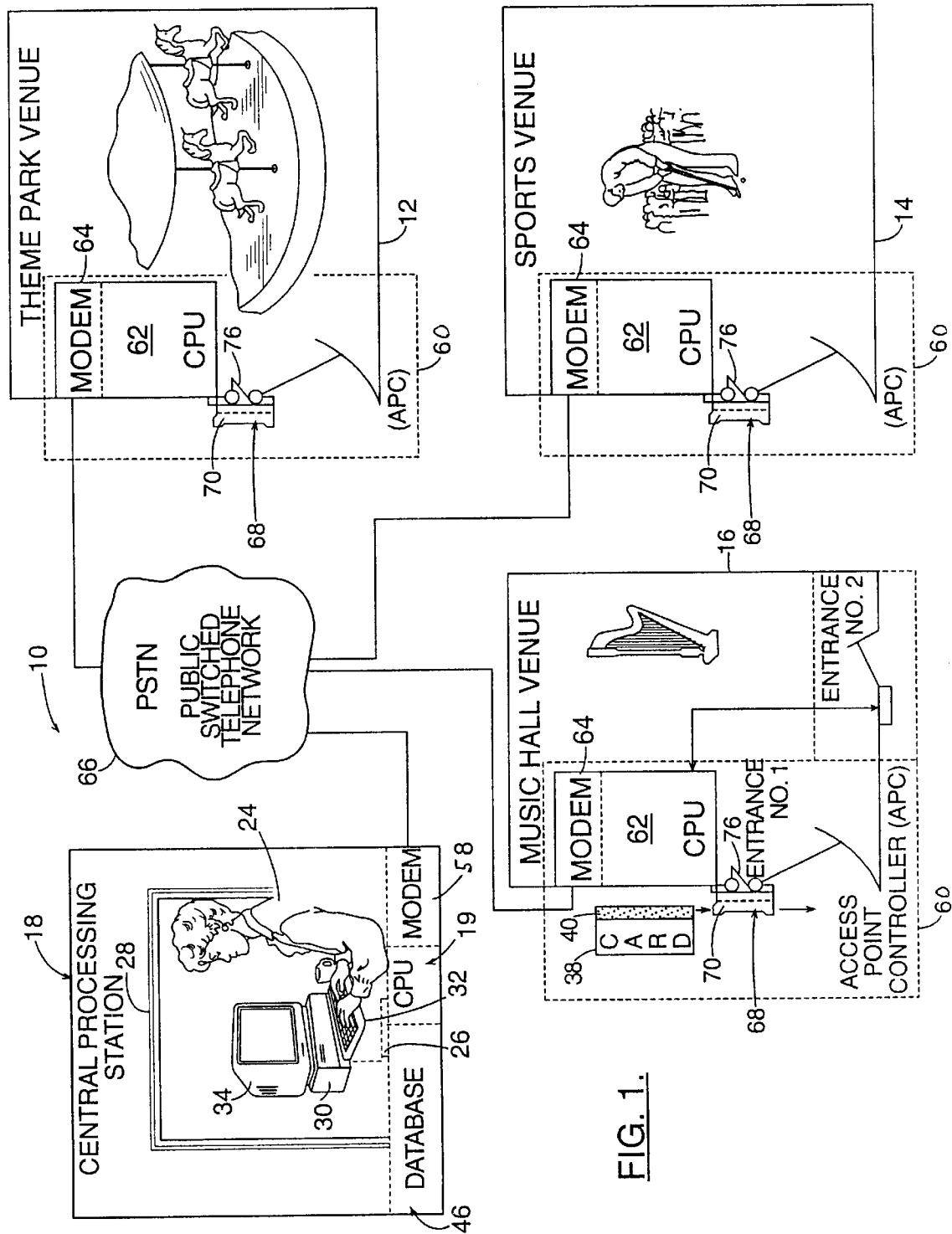
FIG. 1 is an overview block diagram of the subscriber access system of the present invention showing the general environment and high level components of the system.

The present invention will now be described more fully with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. In the drawings, like numbers refer to like elements throughout.

The present invention is advantageous over prior art ticketing and access control systems, and now provides a computer access system that includes a central processing station for permitting purchasing of rights for future access to various entertainment events at a plurality of different venues. The system has real time control of subscriber access based upon the database record of the purchased access rights.

As shown in FIG. 1, the system is generally illustrated at 10, and includes three different venues, i.e., a theme park venue 12, such as the type typically having a number of different rides or exhibits; a sports venue 14, such as the illustrated golf outing; and a music hall venue 16 where a concert event will be given. Naturally, the system 10 can provide access and control over even more venues, such as sports arenas, theaters, museums and other events where admission must be purchased and control exercised over who enters. The system 10 can also be used for non-profit activities, such as special exhibitions at museums and other public service events.

Figure 2:
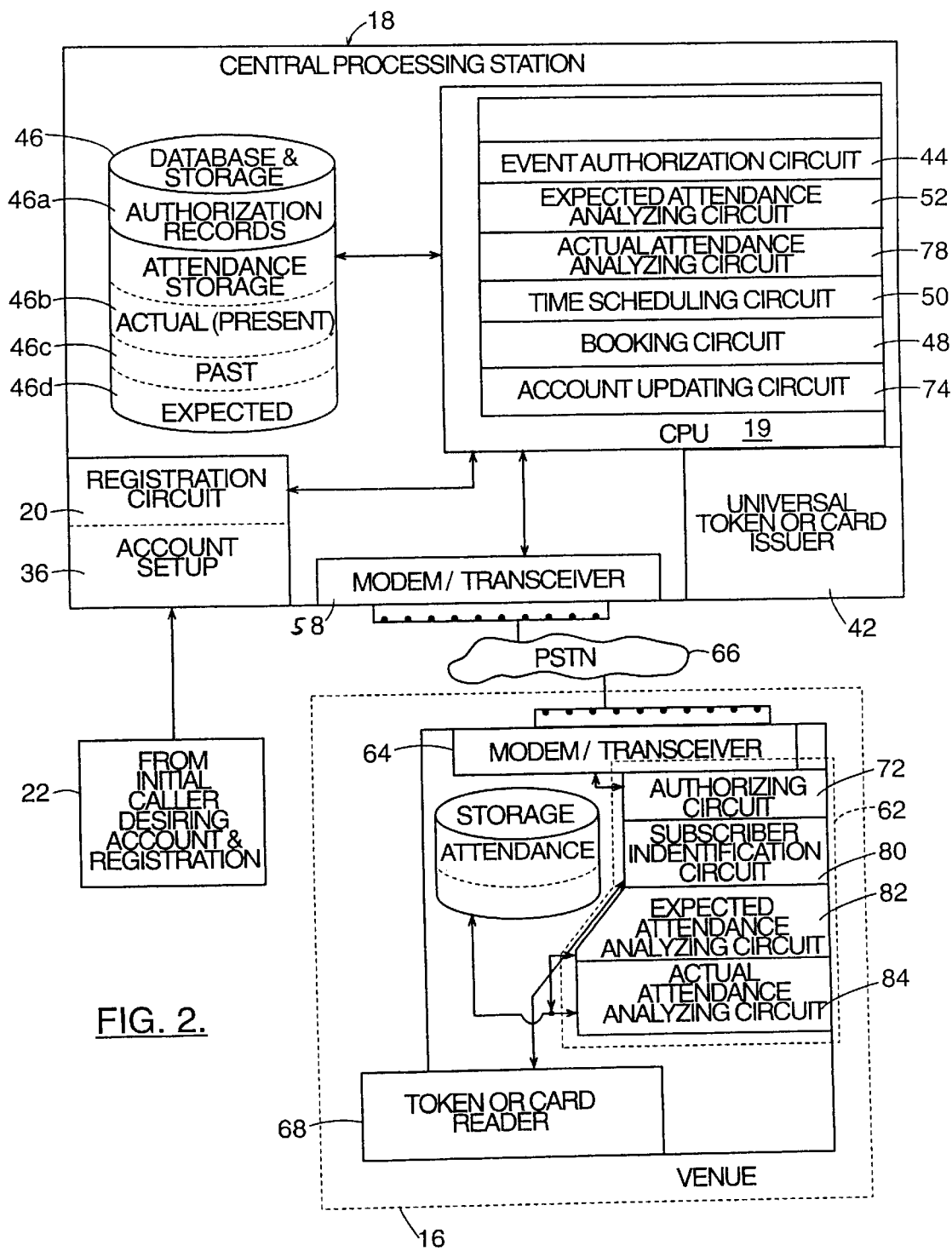
FIG. 2 is a block diagram of the central processing station and access point controller showing various working components.

As further shown in FIGS. 1 and 2, a central processing station 18 includes a central processing unit 19, which communicates with a registration circuit 20 for permitting the registering of subscribers that can be authorized to attend selected entertainment events. These events could be selected events in one venue, or separate events at different venues. Typically, a caller 22 desires to become a subscriber, and calls an operator 24 at the central processing station 18, which acts as a service center for the entire system. Naturally, once a caller becomes a subscriber, with subsequent calls, events can be booked automatically because the caller is already a subscriber. Secure information need not be transmitted again.

The operator 24 would typically receive the call and through an operator interface, indicated generally at 26, register the caller 22 as a subscriber to the system 10, via an operator console 28 having a personal computer, keyboard 32 and CRT 34 for displaying information. The call can be over the public switched telephone network 66. However, the operator 24 could receive the date to be input via facsimile, ISDN, radio frequency, or the Internet and from other communication methods known to those skilled in the art. In addition, the functions performed by the operator 24 could be automated, as would be readily understood by those skilled in the art. For example, the caller could subscribe or perform other functions based on a series of visual or audible prompts.

The operator 24 enters the appropriate information received from the caller relating to credit card information and establishes a payment account through an appropriate account setup circuit 36. At this time, the subscriber to the system then may be issued a card or universal token 38, which could include preferably magnetic and optical information such as contained in a strip 40 as shown in FIG. 1. Other information could be included on the card, such as known to those skilled in the art. A universal token or card issuer circuit 42 processes the data received during initial registration, and issues the token or card based on the data. The universal token or card 38 is mailed to the caller. The universal token or card 38 would be applicable to all venues that are part of the system, including those owned by different business entities. It is also possible for cards or tokens to be issued as "empty entitlement" cards, such as through magazines, direct mailings, or other methods through which potential subscribers can receive cards or tokens. If a recipient of the card or token is interested in becoming a subscriber, then the recipient calls the operator to activate the card or token and become a subscriber. For example, a card could be peeled from a magazine advertisement, and then activated by a call to the operator 24.

Even though the subscriber account is now established, no charges have yet been incurred. If the card is lost or stolen, the validity of the lost or stolen card is revoked by the central processing station 18. This card or universal token 38 could have an identifier, such as encoded on the magnetic or optical strip 40, which is a particularly unique identifier to the individual. The identifier could include unique attributes of the individual, including facial characteristics, a picture, or other identifying indicia.

Additionally, cards could be issued to individuals through special advertisements, such as those found on TV or in magazines. One could receive a card, but it would not be "activated," e.g., an account set up, until the card bearer contacts the central processing station 18 and gives the requisite personal and billing information. Such information could be provided by a direct telephone call, the Internet or facsimile.

When a subscriber is interested in a particular entertainment event at a particular venue, such as a concert event at the music hall 16, the subscriber calls the central processing station 18 and requests attendance at the particular concert event. Again, the request or call can be made by a direct call, Internet or facsimile. The operator 24 inputs the request and, through an event authorization circuit 44, generates and stores a record relating to authorization of the subscriber to attend the selected event, in this instance the concert event. This generated record is stored within the authorization records section 46a database and storage unit 46. The central processing station may then verify the event by a person if a personal call had been made, return E-mail, such as on the Internet or return facsimile.

As more people call in to attend the concert event at the music hall, a booking circuit 48 coordinates availability at the selected concert event to ensure seat availability and maintain records of what seats are available. A time scheduling circuit 50 can authorize attendance of an authorized subscriber at the concert event at a predetermined time. Based on past concert events at the music hall and perhaps the number of subscribers that are calling to attend the concert event, an expected attendance analyzing circuit 52 performs the processing functions to determine what the expected attendance may be at that particular concert event.

As shown in FIG. 1, each venue 12, 14 and 16 includes an access point controller 60 having a processing unit (CPU) 62 (shown by dotted lines 62 in FIG. 2) in communication with the central processing station 18, typically through an access point modem 64 that establishes communication through the public switched telephone network (PSTN) 66 to the central processing station 18 via another modem 68 located at the central processing station. The modems 54, 68 act as the transceivers for exchanging information about subscribers, events and venues. Information can be exchanged also over the Internet, ISDN, through satellite communication systems, and other communication systems known to those skilled in the art.

Each access point controller 60 includes a subscriber identifier reading mechanism 68, such as a card or universal token reader, for reading a subscriber identifier presented by the subscriber attending the respective entertainment event. In the illustrated embodiment shown in FIG. 1, the illustrated card 38 includes the strip 40 that is read by a reading mechanism 68, which includes a slot 70 through which the card is slid. The card could include magnetic, optical and other data, which would be read by an optical reader.

At this time, an authorizing confirming circuit 72 of the central processing unit 62 generates a signal through the public switched telephone network 66 to the central processing station 18 and confirms with the event authorization circuit 44 that the subscriber attending the respective entertainment event has been authorized based upon the subscriber identifier. It should be understood that verification can be done on-line in real time as just described, or through a venue server that periodically has received information from the central processing station relating to authorized persons who will attend an event at the venue. Also, information could be exchanged in batch mode, instead of in real time. At this time, an account updating circuit 74 could charge the subscriber account for the cost of the event. The central processing unit 62 then generates a signal to an access granting mechanism 76, such as a turn style or other means, and grants access at the entertainment event to the authorized subscriber. The same sequence occurs at each entrance to the music hall venue 16.

At the central processing station 18, real time tracking of attendance is maintained through the communication over the public switched telephone network 66 between the access point controllers 64 and the central processing station 18. An actual attendance analyzing circuit 78 then stores this real time data in an attendant actual attendance storage section 46b of the database and storage unit 46. Past attendance records are stored in the past attendance storage section 46c of the database.

The central processing station can work with attendance data concerning past entertainment events, and based upon attendance data at these past events, and the actual attendance at a present event, analyze this data by means of the expected attendance analyzing circuit 52, and thus determine the expected or future attendance at another future event. This future event could occur only a few hours in the future. This date would then be stored in the expected attendance section 46b of the database and storage unit 46d.

As shown in FIG. 2, the entertainment venue can also include a subscriber identification circuit 80 for ensuring that the identity of the person presenting the token is the actual subscriber. For example, the magnetic or optical strip located on the card or token 38 could include data of a picture image of the subscriber, which could be brought up on a screen at the entrance to the event to verify identity. Additionally, the subscriber identification circuit 80 could request identity information from the database and storage unit 46 located at the central processing station 18, which could be transmitted in real time over the public switched telephone network back to the entertainment venue. In some embodiments, for example, the entertainment venue also can include an expected attendance analyzing circuit 82 and actual attendance analyzing circuit 84 similar to that contained in the central processing station 18 so that events at the particular entertainment venue can be studied and analyzed.

Figure 3:
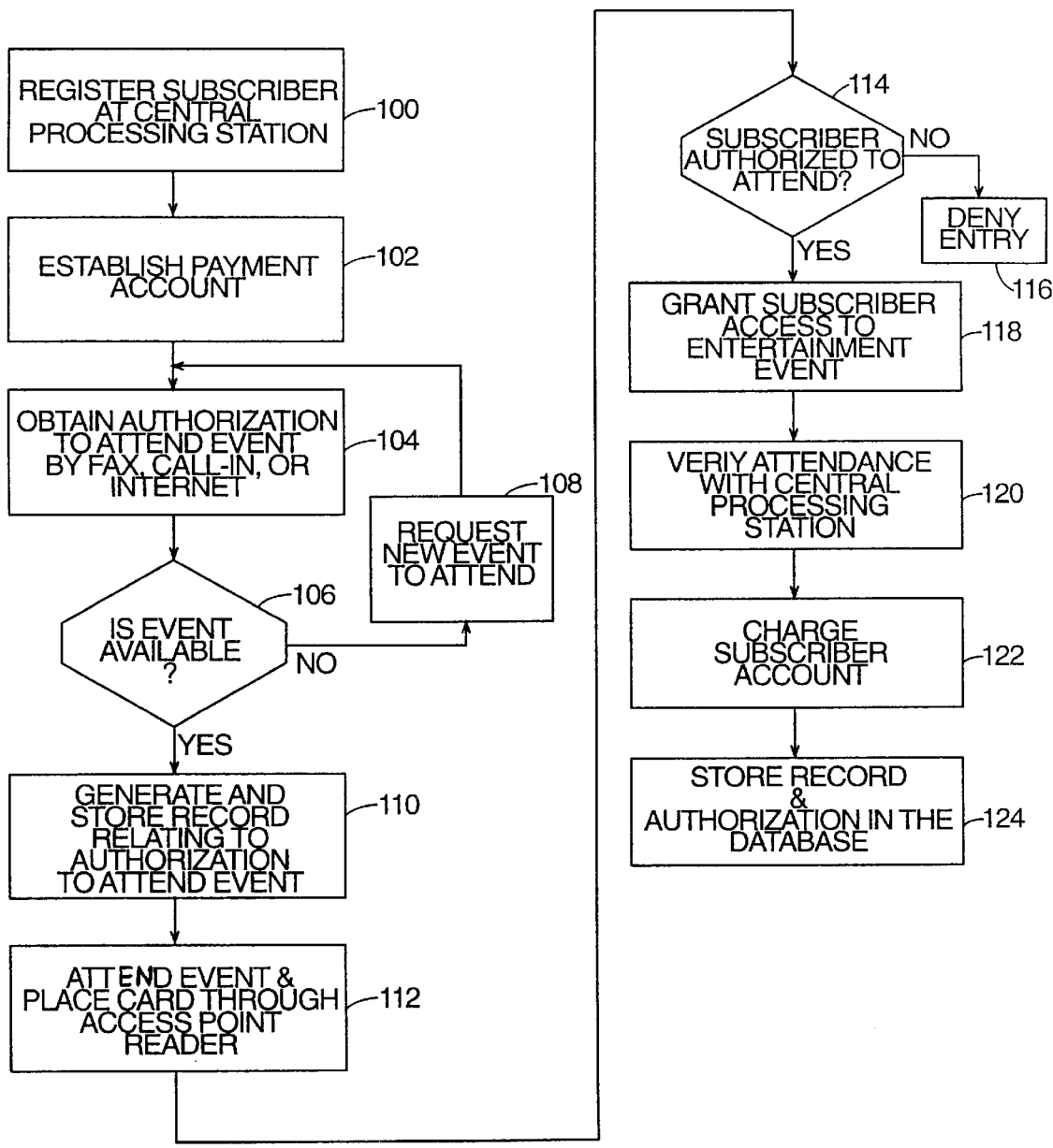
FIG. 3 is a flow chart illustrating one operation of the subscriber access system of the present invention.

FIG. 3 illustrates a flow chart showing one aspect of the method which is typical of the operation of the system. For purposes of clarity, block descriptions are given starting in the 100 series. As illustrated, a subscriber is first registered at the central processing station (Block 100) and a payment account established (Block 102). The subscriber picks an event and calls the central processing station to obtain authorization to attend the event (Block 104). Such a call-in could include sending a message via the Internet or even via facsimile. The operator at the console enters the appropriate data and the booking circuit checks the database and storage unit 46 for attendance and availability (Block 106). If the event is not available, then the operator could request the subscriber to pick a new event (Block 108) or reschedule.

At this time, the subscriber may call in once again to obtain authorization to attend the event. If the event is available, the central processing station 18 generates and stores a record relating to the authorization to attend the event (Block 110). A record or verification that the event is available can be sent back to the subscriber via fax, phone or the Internet, if desired. The central processing station 18 stores this data in the database and storage unit 46. The subscriber attends the event and places the card or token through the access point reader (Block 112). Card or token verification can be done on-line from the central processing station, or it can be done on-line directly from a venue server, where it was downloaded periodically from the central processing station. The access point controller 60 through its processing unit 62 and modem 64 contacts the central processing station through the public switched telephone network or other communication means known to those skilled in the art to determine if the subscriber is authorized to attend an event (Block 114). If the subscriber is not authorized to attend, then entry is denied (Block 116). If the subscriber is authorized to attend, then the central processing unit generates a signal to grant the subscriber access to the entertainment event (Block 118). The attendance is then verified with the central processing station (Block 120) by communicating over the public switched telephone network, Internet or other means. The subscriber account is charged and updated (Block 122) and the attendance record and authorization stored in the database and storage unit (Block 124). of course, the subscriber's account could also be charged when the access rights are requested.

The present invention offers many advantages over other ticketing and entertainment access systems. Internal calls are decreased and ticket distribution can be organized to reach all potential customers. Fraud can be significantly reduced and the system provides critical marketing data for past, present and future attendance analysis. The use of an "empty entitlement" ticket or token can be provided to all subscribers free of charge. They then can have the possibility of activating the card through multiple processes such as the telephone, Internet, and facsimile, as well as other communication systems known to those skilled in the art. The cards or tokens can also be provided as gifts from specialized magazines, at participating partner sites, and by even calling distribution centers. Naturally, the card or token has no admission rights preset in the card, but would be activated by calling a service center where the central processing station is located. The subscriber then calls a center and activates the card for a specific number of days at any other sites that are part of the system. The card or token can be activated for multiple sites at the same time and can be valid forever and reused.

There is little risk for stolen or lost cards or tokens because the real time activity allows for complete cancellation. There is also reduced concern for security purposes in the transmittal of secured information such as credit card numbers. There is also risk when subscribers use the Internet or place telephone calls. The secured information is transmitted once during initial subscription. Subsequent communication via the Internet or telephone network would concern arrangements for attending an event, not subscription.

The system also provides various marketing advantages. Full customer demographic data can be obtained and historical data on the usage from when the ticket was activated can be realized for various sites. Various historical information can be kept about different users and also maintained about when tickets, cards or tokens have been renewed or reissued.

A central processing station acting as a service center can be an independent organization. It can distribute revenue between various participants and venues based upon accesses purchased by the subscribers. Of course, the central processing station could be provided by an interconnected plurality of such centers. It can also promote various events and manage a loyalty program.

Many modifications and other embodiments of the invention will come to the mind of one skilled in the art having the benefit of the teachings presented in the foregoing descriptions and the associated drawings. Therefore, it is to be understood that the invention is not to be limited to the specific embodiments disclosed and that the modifications and embodiments are intended to be included within the scope of the dependent claims.

That which is claimed is:

1. A system for granting authorized subscribers access to selected ones of a plurality of entertainment events at a plurality of separate and geographically spaced entertainment venues wherein said entertainment venues are operated or owned by the same or different organizations, said system comprising:
  a central processing station comprising:
    registration means for permitting the registering of subscribers that can later purchase admission rights and be authorized to be admitted into and attend selected entertainment events wherein said entertainment event can be located at one of either the same or geographically spaced entertainment venues; and
    event authorization means for generating and storing a record relating to authorization of a subscriber to attend a selected entertainment event after the subscriber purchased the rights to attend the entertainment event wherein said entertainment event can be located at one of either the same or geographically spaced entertainment venues;
  a plurality of access point controllers located at respective entertainment venues; and
  a publicly accessible communications network interconnecting the central processing station and said plurality of access point controllers;
  each of said access point controllers comprising:
    subscriber identifier reading means for reading a subscriber identifier presented by the subscriber attending the respective entertainment event;
    authorization confirming means communicating over the communications network and cooperating with said event authorization means for confirming that the subscriber has been authorized to attend the entertainment event based upon the subscriber identifier; and
    access granting means positioned at the entrance to the preauthorized entertainment event located at an entertainment venue, cooperating with said authorization confirming means, for granting access at the entertainment event to the authorized subscriber to attend the entertainment event;
    attendance storing means, cooperating with said plurality of reading means, for generating and storing a record relating to actual attendance of the subscriber at the selected entertainment venue;
    actual attendance analyzing means, cooperating with said attendance storing means, for analyzing actual attendance at a past entertainment event; and
    expected attendance analyzing means, cooperating with said event authorization means, for analyzing expected attendance at a future entertainment event.

2. A system according to claim 1 wherein said central processing station further comprises an operator console for permitting an operator to receive a communication from a subscriber.

3. A system according to claim 1 wherein said central processing station further comprises operator interface means for permitting the operator to perform at least one of registration of a subscriber or generation and storing of the record relating to authorization of the subscriber to attend the selected entertainment event.

4. A system according to claim 1 wherein said registration means comprises account means for establishing a payment account for the subscriber.

5. A system according to claim 1 wherein said event authorization means comprises account updating means for updating an account of the subscriber.

6. A system according to claim 1 wherein said event authorization means comprises a database for storing records relating to authorization of subscribers to attend selected entertainment events.

7. A system according to claim 1 wherein said event authorization means comprises booking means for coordinating availability at the selected entertainment event.

8. A system according to claim 1 wherein said event authorization means further comprises time scheduling means for authorizing attendance of an authorized subscriber at the entertainment event at a predetermined time.

9. A system according to claim 1 wherein said central processing station further comprises expected attendance analyzing means, cooperating with said event authorization means, for analyzing expected attendance at a future entertainment event.

10. A system according to claim 1 further comprising expected attendance analyzing means at the entertainment venue, and cooperating with said event authorization means, for analyzing expected attendance at a future entertainment event.

11. A system according to claim 1 wherein said actual attendance analyzing means is located at the entertainment venue.

12. A system according to claim 1 wherein said communications network comprises the public switched telephone network (PSTN).

13. A system according to claim 1 wherein said central processing station further comprises universal token issuing means for issuing a universal token to the subscriber to serve as the subscriber identifier for the plurality of entertainment venues.

14. A system according to claim 13 wherein said subscriber identifier reader comprises a universal token reader.

15. A system according to claim 14 wherein said universal token reader comprises at least one of a magnetic and optical reader.

16. A system according to claim 1 wherein said central processing station further comprises a first transceiver for communicating over the communications network; and wherein said authorization confirming means comprises a second transceiver for communicating over the communications network and with the first transceiver in real time.

17. A system according to claim 16 wherein said authorization confirming means further comprises a processor cooperating with said transceiver for controlling said access granting means.

18. A system for granting authorized subscribers access to selected ones of a plurality of entertainment events at a plurality of separate and geographically spaced entertainment venues wherein said entertainment venues are operated or owned by the same or different organizations, said system comprising:

a central processing station comprising:
  registration means for permitting registering of subscribers that can later purchase admission rights and be authorized to be admitted into and attend selected entertainment events;
  event authorization means for generating and storing a record relating to authorization of a subscriber to attend a selected entertainment event after the subscriber purchased the rights to attend the entertainment event wherein said entertainment event can be located at one of either the same or geographically spaced entertainment venues; and
  a plurality of access point controllers located in at least at one entertainment venue;
  a publicly accessible communications network interconnecting the central processing station and plurality of access point controllers; each of said access point controllers comprising:
  subscriber identifier reading means for reading a subscriber identifier presented by the subscriber attending the respective entertainment event;
  authorization confirming means, cooperating with said event authorization means for confirming in real time that the subscriber attending the respective entertainment event has been authorized and based upon the subscriber identifier;
  access granting means positioned at the entrance to the preauthorized entertainment event located at an entertainment venue, cooperating with said authorization confirming means, for granting access at the entertainment event to the authorized subscriber; and
  expected attendance analyzing means, cooperating with said event authorization means, for analyzing expected attendance at a future entertainment event.

19. A system according to claim 18 wherein said expected attendance analyzing means is at the central processing station.

20. A system according to claim 18 wherein said expected attendance analyzing means is at the at least one entertainment venue.

21. A system according to claim 18 wherein said central processing station further comprises an operator console for permitting an operator to receive a communication from a subscriber.

22. A system according to claim 18 wherein said central processing station further comprises operator interface means for permitting the operator to perform at least one of registration of a subscriber or generation and storing of the record relating to authorization of the subscriber to attend the selected entertainment event.

23. A system according to claim 18 wherein said registration means comprises account means for establishing a payment account for the subscriber.

24. A system according to claim 18 wherein said event authorization means comprises account updating means for updating an account of the subscriber.

25. A system according to claim 18 wherein said event authorization means comprises a database for storing records relating to authorization of subscribers to attend selected entertainment events.

26. A system according to claim 18 wherein said event authorization means comprises booking means for coordinating availability at the selected entertainment event.

27. A system according to claim 18 wherein said event authorization means further comprises time scheduling means for authorizing attendance of an authorized subscriber at the entertainment even at a predetermined time.

28. A system according to claim 18 wherein said central processing station further comprises:
  attendance storing means, cooperating with said plurality of reading means, for generating and storing a record relating to actual attendance of the subscriber at the selected entertainment venue; and
  actual attendance analyzing means, cooperating with said attendance storing means, for analyzing actual attendance at a past entertainment event.

29. A system according to claim 18 further comprising:
  attendance storing means, cooperating with said plurality of reading means, for generating and storing a record relating to actual attendance of the subscriber at the selected entertainment venue; and
  actual attendance analyzing means at the entertainment venue, and cooperating with said attendance storing means, for analyzing actual attendance at a past entertainment event.

30. A system according to claim 18 including a communications network interconnecting said control processing station and said plurality of access point controllers.

31. A system according to claim 30 wherein said communications network comprises the public switched telephone network (PSTN).

32. A system according to claim 18 wherein said central processing station further comprises universal token issuing means for issuing a universal token to the subscriber to serve as the subscriber identifier for the plurality of entertainment venues.

33. A system according to claim 32 wherein said subscriber identifier reader comprises a universal token reader.

34. A system according to claim 33 wherein said universal token reader comprises at least one of a magnetic and optical reader.

35. A system according to claim 18 wherein said central processing station further comprises a first transceiver for communicating over the communications network; and wherein said authorization confirming means comprises a second transceiver for communicating over the communications network and with the first transceiver in real time.

36. A system according to claim 35 wherein said authorization confirming means further comprises a processor cooperating with said transceiver for controlling said access granting means.

37. A system for granting authorized subscribers access to selected ones of a plurality of entertainment events at a plurality of separate and geographically spaced entertainment venues wherein said entertainment venues are operated or owned by the same or different organizations, said system comprising:
  a central processing station comprising:
    registration means for permitting registering of subscribers that can later purchase admission rights and be authorized to be admitted into and attend selected entertainment events;
    event authorization means for generating and storing a record relating to authorization of a subscriber to attend a selected entertainment event after the subscriber purchased the rights to attend the entertainment event wherein said entertainment event can be located at one of either the same or geographically spaced entertainment venues; and
    a universal token issuing means for issuing a universal token to the subscriber to serve as a subscriber identified for the plurality of entertainment venues; and a plurality of access point controllers located at respective entertainment venues;

a publicly accessible communications network interconnecting the central processing station and plurality of access point controllers; each of said access point controllers comprising:

a universal token reader for reading the subscriber identified from the universal token presented by the subscriber attending the respective entertainment event;

authorization confirming means, cooperating with said event authorization means for confirming in real time that the subscriber has been authorized to attend the entertainment event based upon the subscriber identifier; and access granting means positioned at the entrance to the entertainment event of the entertainment venue, cooperating with said authorization confirming means, for granting access at the preauthorized entertainment event to the authorized subscriber to attend the entertainment event located at an entertainment venue;

attendance storing means, cooperating with said plurality of reading means, for generating and storing a record relating to actual attendance of the subscriber at the selected entertainment venue;

actual attendance analyzing means, cooperating with said attendance storing means, for analyzing actual attendance at a past entertainment event; and expected attendance analyzing means, cooperating with said event authorization means, for analyzing expected attendance at a future entertainment event.

38. A system according to claim 37 wherein said universal token reader comprises at least one of a magnetic and optical reader.

39. A system according to claim 37 wherein said central processing station further comprises an operator console for permitting an operator to receive a communication from a subscriber.

40. A system according to claim 37 wherein said central processing station further comprises operator interface means for permitting the operator to perform at least one of registration of a subscriber or generation and storing of the record relating to authorization of the subscriber to attend the selected entertainment event.

41. A system according to claim 37 wherein said registration means comprises account means for establishing a payment account for the subscriber.

42. A system according to claim 37 wherein said event authorization means comprises account updating means for updating an account of the subscriber.

43. A system according to claim 37 wherein said event authorization means comprises a database for storing records relating to authorization of subscribers to attend selected entertainment events.

44. A system according to claim 37 wherein said event authorization means comprises booking means for coordinating availability at the selected entertainment event.

45. A system according to claim 37 wherein said event authorization means further comprises time scheduling means for authorizing attendance of an authorized subscriber at the entertainment event even at a predetermined time.

46. A system according to claim 37 wherein said central processing station further comprises expected attendance analyzing means, cooperating with said event authorization means, for analyzing expected attendance at a future entertainment event.

47. A system according to claim 37 further comprising expected attendance analyzing means at the entertainment venue, and cooperating with said event authorization means, for analyzing expected attendance at a future entertainment event.

48. A system according to claim 37 wherein said actual attendance analyzing means is located at the entertainment event.

49. A system according to claim 37 including a communications network interconnecting the control processing station and said plurality of access point controllers.

50. A system according to claim 49 wherein said communications network comprises the public switched telephone network (PSTN).

51. A system according to claim 37 wherein said central processing station further comprises a first transceiver for communicating over the communications network; and wherein said authorization confirming means comprises a second transceiver for communicating over the communications network and with the first transceiver in real time.

52. A system according to claim 51 wherein said authorization confirming means further comprises a processor cooperating with said transceiver for controlling said access granting means.

\* \* \* \* \*